Oct. 21, 1952 — H. E. HAYNES — 2,614,524
CAPACITOR MANUFACTURING EVAPORATION APPARATUS
Original Filed Aug. 22, 1946 — 2 SHEETS—SHEET 1
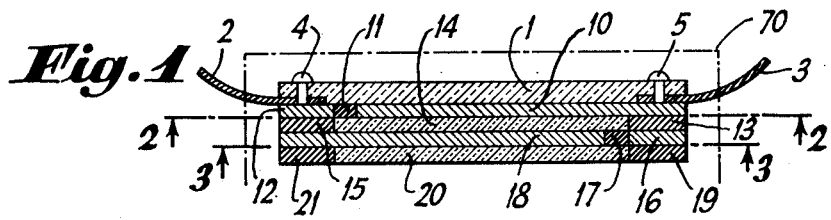
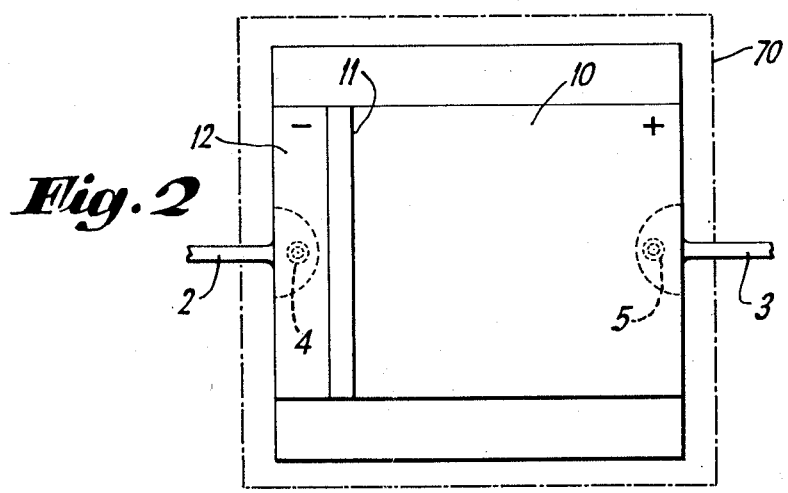
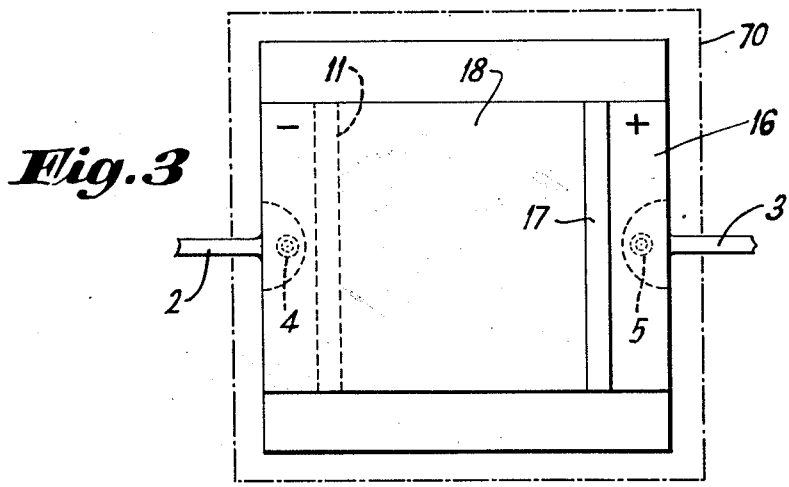
INVENTOR
HAROLD E. HAYNES
BY
ATTORNEY Oct. 21, 1952 — H. E. HAYNES — 2,614,524
CAPACITOR MANUFACTURING EVAPORATION APPARATUS
Original Filed Aug. 22, 1946 — 2 SHEETS—SHEET 2
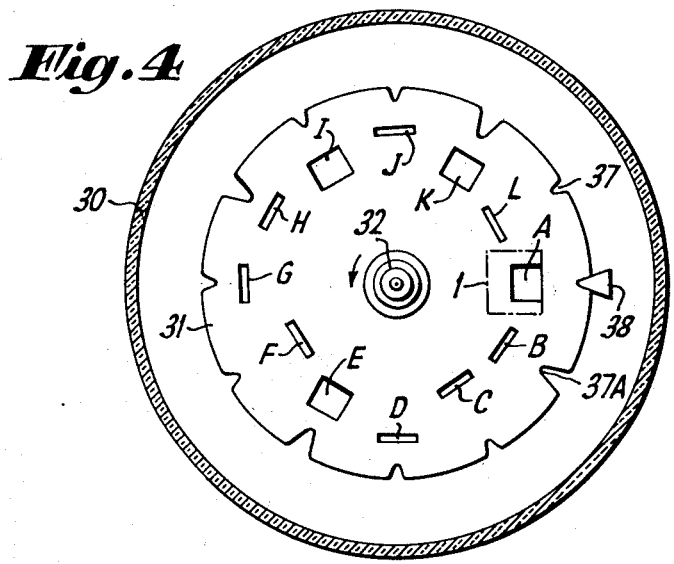
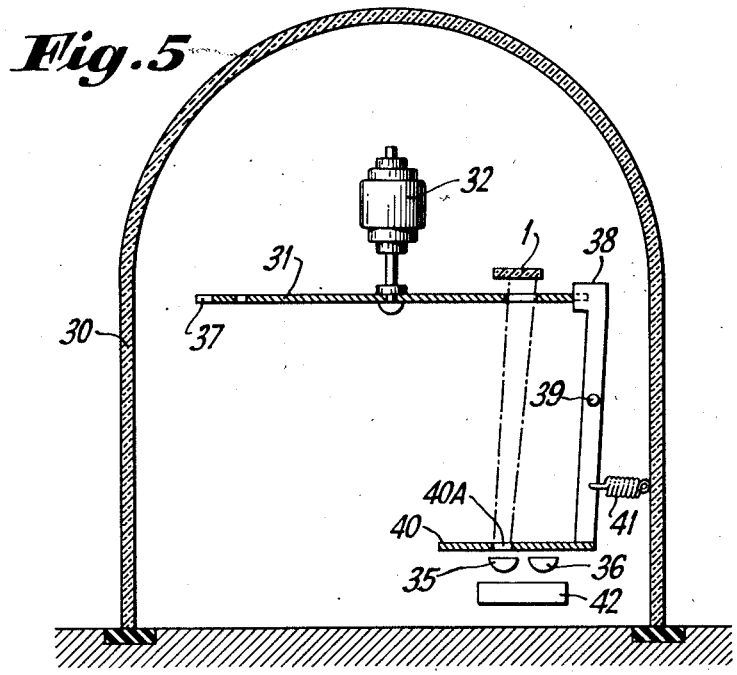
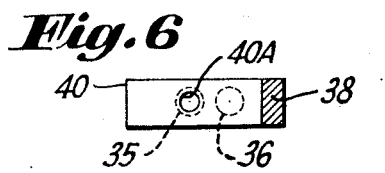
INVENTOR
HAROLD E. HAYNES
BY
ATTORNEY Patented Oct. 21, 1952

2,614,524

UNITED STATES PATENT OFFICE 2,614,524

CAPACITOR MANUFACTURING EVAPORATION APPARATUS

Harold E. Haynes, Audubon, N. J., assignor to Radio Corporation of America, a corporation of Delaware Original application August 22, 1946, Serial No. 692,355. Divided and this application June 5, 1948, Serial No. 31,381

5 Claims. (Cl. 118—49)

1

The present invention relates to an improved electrical capacitor and a method of constructing the same.

This application is a divisional application of my copending application Serial No. 692,355, filed August 22, 1946, now abandoned, which application was directed to the condenser structure, whereas this divisional application is directed to the machine and process.

An object of the invention is to provide a capacitor having a high value of capacitance relative to the space occupied, having stability of capacitance value and being suitable for use in alternating current circuits.

The capacitor of this invention is made up of alternate layers of evaporated dielectric and evaporated metallic conducting layers of films. The capacitor is built upon an insulating sheet or a thin sheet of metal by evaporating first a dielectric layer, then applying alternately extending metallic layers, then another dielectric layer, etc.

In the conventional alternate-layer type of capacitor construction, the factors which make for high capacitance in small space are (1) thinness of dielectric, (2) high dielectric constant, and (3) thinness of conducting plates so as not to occupy more space than necessary. This invention provides a means of realizing large improvements in factors 1 and 3.

This invention involves a process wherein a capacitor is made by evaporating alternate layers of conducting and non-conducting materials, with suitable electrical connections, the conducting films being only thick enough to provide satisfactorily low resistance and the dielectric films only thick enough to withstand the required working or peak voltage.

The invention will be more clearly understood by referring to the accompanying drawing, in which:

Fig. 1 is a cross-section of the capacitor of this invention;

Fig. 2 is a sectional view of Fig. 1, the section being taken on line 2—2;

Fig. 3 is a sectional view of Fig. 1, the section being taken on line 3—3;

Fig. 4 is a plan view of the capacitor building machine and mask;

Fig. 5 is a sectional elevation of the capacitor building machine of Fig. 4; and Fig. 6 is a detailed plan view of Fig. 5.

Referring now to Figs. 1, 2 and 3 of the drawings, an insulating base or matrix 1 has secured thereto metallic terminal members 2 and 3. The terminal members 2 and 3 are secured in a semi-circular recessed portion on base 1 by means of pins 4 and 5. The capacitor of this invention is built upon matrix 1 by having a first layer of coatings comprising a metal portion 10, a dielectric portion 11 and a metal portion 12 deposited thereon. The various metallic and dielectric portions are placed in position on matrix

2

1 by means of a machine having suitable masks which will be described in more detail in connection with Figs. 4, 5 and 6. The second layer comprises a metal portion 13, a dielectric portion 14 and a metal portion 15. The third layer comprises a metal portion 16, a dielectric portion 17 and a metal portion 18. The fourth layer comprises a metal portion 19, a dielectric portion 20 and a metal electrode portion 21. These four layers complete one cycle of operation in building the capacitor section or stack. The fifth layer is a repetition of the first mentioned layer and comprises metal portion 10, dielectric portion 11, and metal portion 12. It is to be noted that the metal portions 12, 13, 15, 16, 19 and 21 form metallic spacing members, the thickness of a spacing member being substantially the same as dielectric members 14 and 20. The first layer comprises the metallic portion 10 which forms the positive electrode of the condenser. The insulation portion 11 forms a dielectric spacer or barrier between the positive electrode 10 and a metal spacing member 12. The second layer comprises a metallic spacing member 13, the condenser dielectric 14 and a metallic spacing member 15. The third layer includes a metallic spacing member 16, a dielectric spacer or barrier portion 17, and a metallic portion 18. The metallic portion 18 serves as the negative electrode of the condenser. The fourth layer comprises metallic portion 19, dielectric portion 20, and metallic spacing portion 21. The capacitor stack is built up of any number of layers by repeating the cycle mentioned above which includes metallic and dielectric portions 10 to 21, inclusive. The insulation base or matrix may be of metal with an insulation coating (not shown), and means provided such as insulating bushings (not shown) to insulate the terminals.

The manner in which these layers are built up will be more completely understood by referring to Figs. 4, 5 and 6, showing the capacitor building machine and mask above which the matrix 1 is secured by any suitable means within a vacuum chamber 30, which is preferably in the form of a bell jar. There is located within the bell jar 30 a circular disc 31 which is driven by a motor 32. The motor is preferably geared down to allow conveniently slow operation (by any suitable means, not shown). The disc 31 has a plurality of apertures, indicated by the letters A to L, inclusive. The apertures are properly shaped and so located on the disc as to form a mask to properly evaporate the dielectric and conductive material in a proper sequence to form the condenser layers described above in connection with Figs. 1, 2 and 3. The disc 31 has the twelve apertures A to L, inclusive, spaced approximately 30° apart, which will allow deposition of the two evaporated materials in proper sequence and shape upon the matrix 1. For example, aperture A is to permit depositing metal to form the conductive layer 10; aperture B is to permit depositing a narrow strip of dielectric material forming the barrier 11; and aperture C permits a deposit of conductive material to form the spacer 12. These three apertures complete the forming of the first layer. Aperture D permits a deposit of metal to form spacer 13; aperture E permits a deposit of dielectric material to form the condenser dielectric 14; and aperture F permits a deposit of conductive material to form the spacer 15. The apertures D, E and F thus complete the second layer. The third layer is formed by having aperture G permit the deposit of conductive material to form the spacer 16; aperture H forms the dielectric barrier 17; and aperture I forms the electrode 18 by depositing conductive material on the previously formed layers 1 and 2. The fourth layer is accomplished by having aperture J permit a deposit of conductive material to form the spacer 19; aperture K permits the deposit of dielectric material to form the condenser dielectric 20 by depositing conductive material over the third layer; and the final operation is accomplished by having aperture L permit the deposit of conductive material to form the spacer 21. When this sequence or cycle of operation has been completed, the disc is then back at its starting position and another cycle of operation is accomplished by placing layers 5, 6, 7 and 8 upon the previously formed layers 1, 2, 3 and 4. Any number of layers may be built up to obtain the desired condenser capacity. However, if desired, a complete condenser section may comprise only the first four mentioned layers. The completed sections may be stacked up and connected either in series or parallel.

Apertures A to L, inclusive, mentioned above, serve to indicate how the rotation of the mask may be continued on throughout its rotatable length by repeating the cycle of capacitor building operation. Located beneath the mask 31 are two vessels 35 and 36. The vessel 35 contains the conductive material to be evaporated upon matrix 1 and the vessel 36 contains the dielectric material to be evaporated upon matrix 1.

Opposite the apertures A, C, D, F, G, I, J and L in disc 31, and located on its periphery, are V-shaped detents 37 whose depth is made such as to cause a cam follower 38 (which is pivoted at 39 by means of a pin 38) to actuate a second mask 40. Opposite the apertures B, E, H and K are V-shaped detents 37A which have a greater depth than detents 37 and therefore, move mask 40 a greater distance. The mask 40 is pivoted to the lower part of 38 and has an aperture 40A which is located below the apertures in disc 31 and just above the vessels 35 and 36, so that by action of cam follower 38 and its associated parts, moving the mask 40, there will be produced a stream of the desired evaporated materials which are located in vessels 35 and 36. Suitable heating means for vessels 35 and 36 are located at 42.

The lever arm or cam follower 38 is held against the periphery of disc 31 by means of a spring 41 which applies spring tension at the full radius of the disc, except when evaporation is desired. In the position of the full radius, the mask 40 (operated through lever 38 and pivot 39) covers both the vessels 35 and 36 containing the conducting material and dielectric material, respectively. The disc 31 is rotated by motor 32 to a position such that one of the apertures is directly below the matrix 1 upon which the capacitor is to be built. In this position the spring 41 urges the cam follower 38 to drop into the corresponding detent, causing the second mask 40 to uncover the proper vessel and thus evaporate the desired material.

In the position shown in Fig. 4 (the detent being in position A), a conductive layer will be deposited upon the matrix 1 because in this position aperture 40A in the second mask uncovers vessel 35. In position B, the detent 37A is of greater depth and therefore causes member 38 to move a greater distance, which will then uncover vessel 36 to deposit dielectric material on matrix 1. The entire sequence of operations mentioned above will be accomplished by having the lever 38 drop in the detent located adjacent to the aperture, the entire operation being automatic by merely causing the motor to operate for the proper time and at the right interval. The position of the vessels will not need to be changed, since they are located far enough from the apertured disc 31 so as to cause the material to be deposited in nearly the same position, irrespective of which vessel is uncovered by the second mask 40.

In the operation of this device, the appropriate materials for the different phases of the cycle of operation are heated and evaporated continuously from the two boats or vessels 35 and 36 which are covered and uncovered by mask 40, the mask 40 being operated in the proper relation to the position of the first movable mask 31. When part A of mask 31 is located below the inch-square capacitor being built (or any other desired size), conducting material from boat 35 is evaporated on matrix 1 to a thickness equal to that of the dielectric. This forms electrode 10 of the capacitor. When part B is over the working area, the dielectric barrier is formed on matrix 1 by cam follower 38 moving the mask 40 to uncover boat 36. At part C, a spacer is formed on matrix 1 by evaporation of metal from boat 35. These three operations complete the first layer. At part D more conducting material from boat 35 is evaporated over the first layer to the desired thickness to form a second spacer. Part E forms the dielectric over the first layer. Part F forms a third spacer. Part G forms a spacer over the second layer. Part H forms a dielectric barrier over the second layer. Part I forms the second electrode 18 over the second layer. Part J forms a spacer on the third layer. Part K is for forming the dielectric material over the third layer. Part L is a metal spacer over the third layer. These last three operations complete the fourth layer. The next unit or additional layers of the capacitor is then built up beginning again at A.

I have found that convenient conducting materials should be copper or silver, since they have low resistance and lend themselves well to evaporation. The dielectric may be any (or a combination) of several materials of which some preferred ones are magnesium fluoride, quartz, and aluminum oxide.

A calculation of the properties of a capacitor made by this method is as follows: Assume a plate area of one square inch, conducting layer thickness of 1/100,000 inch, dielectric thickness of 1/50,000 inch. If the conductor is a square inch of copper $10^{-5}$ inch thick, it will have a resistance from one edge to the opposite edge of 0.07 ohm, which should be sufficiently low. If the dielectric constant of the insulation material is, say 5, and the dielectric strength is 500 kv./cm., the capacity per layer of dielectric will be 0.056 mf. and the breakdown voltage may be estimated as 25.4. If the capacitor were built up according to this invention to a thickness of say 0.1 inch, it would have a rating of 18,700 mf. at about 10 volts. For higher voltage uses, a capacitor could be made in the same space to have, say, 187 mf. at 100 volts, or 1.87 mf. at 1000 volts. The 187 mf. condenser would have a total of 666 evaporated layers (which indicates the necessity of a machine as disclosed by Figs. 4, 5 and 6 to complete the processes of the stack construction). Since the exact thickness of layers would not be critical, many of the problems encountered in evaporating films of special optical properties would not arise.

The mask for the boats and the mask for forming the layers move in synchronism and in proper phase with each other beneath the capacitor stack being built up.

As is mentioned above in connection with Figs. 1, 2 and 3, the capacitor stack thus formed is one of a solid stack comprising alternate layers of dielectric and metal material and when used for high voltages it is desirable that the stack be imbedded in a plastic case such as, for example, polystyrene, indicated at 70.

What is claimed is:

1. An electrical capacitor building machine comprising a means to retain a base member of insulation material within an evacuated vessel, a movable disc having apertures therein located beneath one of the surfaces of said base of insulation material, means to move said disc with respect to the surface of said base of insulation material, two fixed vessels, one for holding a metal and the other for holding a dielectric material, said fixed vessels each being positioned beneath certain apertures in said movable disc, a movable mask above said fixed vessels, cam means for simultaneously moving said disc and said mask with respect to said fixed vessels to progressively coat thin layers of metal and dielectric material on said base to form a capacitor.

2. In apparatus for vacuum coating a workpiece by evaporating means, means to selectively apply coatings of at least two different characteristics including a selectively positionable masking element having a plurality of apertures therein, a positionable gating element having an aperture therein, said elements being interposed between said workpiece and said evaporating means with at least one aperture of said masking element and the aperture of said gating element aligned with said workpiece and said evaporating means, and means responsive to the positioning of said masking element selectively to position said gating element to select the desired one of said evaporating means to apply the coating corresponding to the aperture of said masking element and corresponding to the selected evaporating means.

3. In apparatus for vacuum coating a matrix by evaporating means to selectively apply coatings of at least two different characteristics, a selectively rotatable disc member having a plurality of apertures therein, and a plurality of notches around the periphery thereof corresponding to said apertures, a slideable plate member having an aperture therein, said members being mounted between said matrix and said evaporating means with at least one aperture of said disc member and the aperture of said plate member aligned in a plane defined by said matrix and said evaporating means, a pivotally mounted link connected at one end to said plate member and having the other end engaging the notches of said disc member, said notches varying in depths corresponding to the number of said coatings to position said plate member in response to the positioning of said disc member to select the desired one of said evaporating means to apply a coating to said matrix corresponding to the apertures of said members.

4. In apparatus for vacuum coating a matrix by evaporating means to selectively apply coatings of at least two different characteristics, two evaporating boats, a plate positioned over said evaporating boats, said plate having an aperture therein to permit vapor to rise from one of said boats, a rotatable disc having a plurality of apertures therein and a plurality of notches about the periphery thereof, said notches being of different depths corresponding to the number of said coatings, said disc being mounted beyond said plate with at least one aperture of said disc aligned in the plane defined by said matrix and said evaporating means, said matrix being mounted beyond said disc with the aperture of said plate also aligned in said plane, a lever pivotally arranged between said disc and said plate, one end of said lever engaging the notches of said disc and the other engaging said plate to position said plate in accordance with the position of said disc to select a desired one of said evaporating means to apply the coating corresponding to the apertures of said plate and said disc.

5. In apparatus for vacuum coating a matrix by evaporating means to selectively apply coatings of at least two different characteristics, two evaporating boats, a plate positioned over said evaporating boats, said plate having an aperture therein to permit vapor to rise from one of said boats, a masking member having a plurality of apertures therein and a plurality of depressions arranged therein each corresponding to one of said apertures, said depressions being of different depths in a given direction corresponding to the number of coatings, said masking member being mounted beyond said plate with at least one aperture of said masking member and the aperture of said plate aligned in the plane defined by said matrix and said evaporating boats and arranged in moveable relationship thereto, a lever pivotally arranged between said masking member and said plate, one end portion of said lever engaging the said depressions as a detent and the other end engaging said plate to position the same in accordance with the position of said masking member to select a desired one of said evaporating boats to apply the coating corresponding to the apertures of said plate and said masinkg member.

HAROLD E. HAYNES.

REFERENCES CITED

The following references are of record in the file of this patent:

UNITED STATES PATENTS

| Number | Name | Date |
|---|---|---|
| 1,926,842 | Dubilier | Sept. 12, 1933 |
| 2,160,981 | O'Brien | June 6, 1939 |
| 2,341,827 | Sukumlyn | Feb. 15, 1944 |
| 2,391,595 | Richards et al. | Dec. 25, 1945 |
| 2,398,176 | Deyrup | Apr. 9, 1946 |
| 2,410,720 | Dimmick | Nov. 5, 1946 |
| 2,432,950 | Turner et al. | Dec. 16, 1947 |
| 2,456,708 | Kellog | Dec. 21, 1948 |
| 2,482,329 | Dimmick | Sept. 20, 1949 |